United States Patent Office 3,246,571
Patented Apr. 19, 1966

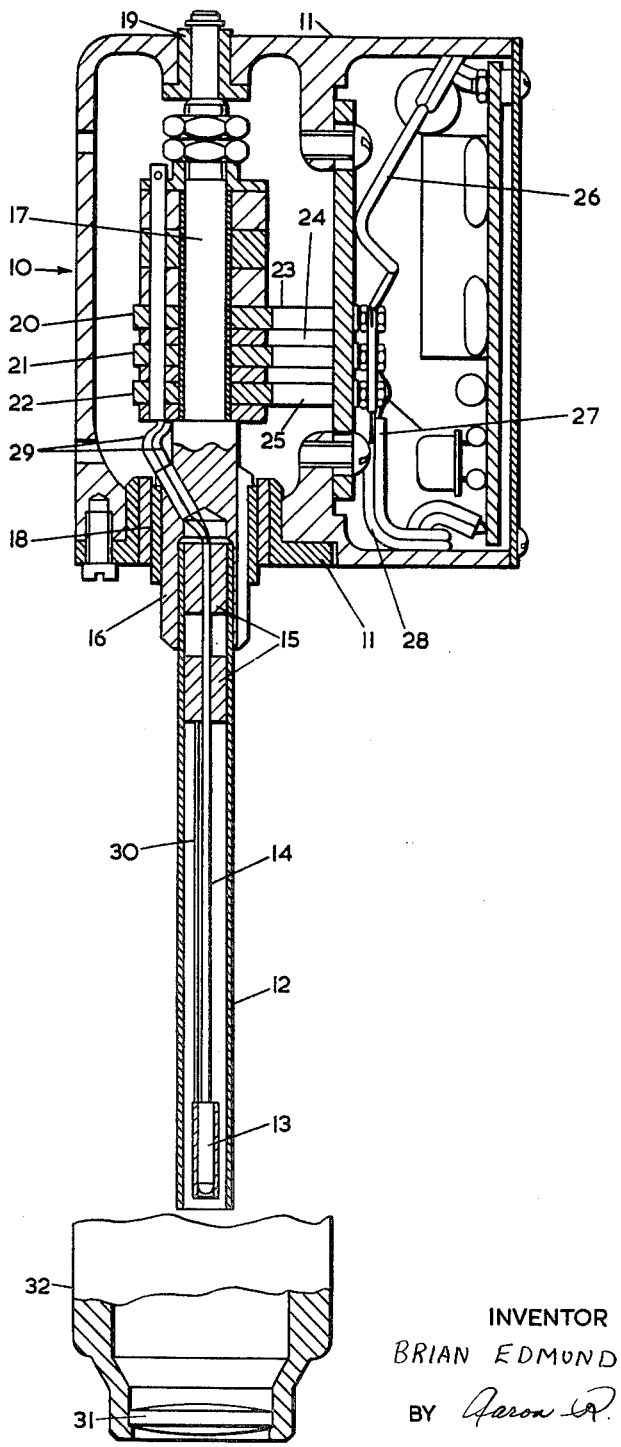

3,246,571
LINE TRACING APPARATUS
Brian Edmund King, Harrow Weald, Middlesex, England, assignor to The British Oxygen Company Limited, a company of Great Britain
Filed May 6, 1964, Ser. No. 365,307
Claims priority, application Great Britain, May 6, 1963, 17,776/63
5 Claims. (Cl. 90—62)

This invention relates to line tracing apparatus of the kind which includes a device for scanning the line to be traced and is used for example to control metal working machines in accordance with line drawings.

In apparatus of this kind it is customary for a photoelectric device to scan to and fro across the line to be traced as the apparatus is moved in the direction of the line. The photoelectric device produces signals indicating the position of the scanner in relation to the line and a control circuit is arranged to energise means for steering the apparatus along the line being traced.

One method of effecting scanning movement of the scanning device is to mount a photoelectric cell eccentrically on a continuously rotating shaft mounted on the apparatus. Another method involves a rigid mounting of the photo electric cell on the apparatus and an eccentric rotatable mounting for a projector adapted to project a beam of light onto the plane of the line to be traced. Alternatively a light redirecting member such as a mirror may be mounted for oscillatory movement in this way.

These methods, involving the use of electric motor drives and eccentric shafts, have a number of disadvantages as regards costs of construction, wear in use, and the weight of mechanism associated with the tracer head.

A step in the direction of mechanical simplicity has been taken by the adoption in one construction of line tracing apparatus of a scanning device in which a scanning member in the form of a photoelectric cell is mounted at the unsupported end of a magnetic cantilever beam, this end of the magnetic beam being oscillated between the poles of an electro-magnet, which is energised by alternating current to produce continuous reversal of pole piece polarity.

It is an object of the present invention to provide a particularly simple form of scanning device for use in a line tracing apparatus.

According to the present invention the scanning member of a scanning device for line following apparatus is mounted on a piezoelectric crystal, and the crystal is excited electrically to cause the scanning member to make an oscillating scanning motion. A varying or alternating potential may be arranged to be applied to the crystal to cause the scanning member to be oscillated at a predetermined scanning frequency.

The piezo-electric crystal may be of rod form, arranged to be supported by one end and arranged to carry the scanning member at the opposite end, the length of the crystal extending from its support corresponding to a predetermined resonating frequency or to a subharmonic of said frequency.

The piezo-electric crystal may be strengthened mechanically by one or more flexible reinforcing members secured thereto, and when the piezo-electric crystal is of rod form at least one flexible reinforcing member in the form of a strip may be secured to the rod co-extensively therewith. The flexible reinforcing member may be of spring steel.

The scanning member may be an optical element arranged to redirect light from a scanned zone to a photoelectric cell, a shutter arranged to interrupt a line image focussed upon a separately mounted photoelectric cell, or, preferably, is a photoelectric cell itself.

An embodiment of the invention will now be described with reference to the accompanying drawing, which is a diagrammatic sectional side elevation of a line tracing apparatus constructed according to the invention.

Referring to the drawing, the line tracing apparatus comprises a device for scanning a line which is designated generally by the reference numeral 10, and which includes a housing 11 carrying a depending protective tubular sheath 12 having its lower end open.

The scanning member is a photo-diode 13 located inside the sheat 12 to protect it from damage, and the photo-diode is attached as by strong adhesive to the lower end of a rod 14 of piezo-electric crystal. The crystal rod 14 is approximately 0.01 inch in thickness and approximately 0.03 inch in width, and approximately two inches in free length, the rod being supported by its upper end from the sheath by means of two spaced supporting members or bushes 15.

The tubular sheath 12 is carried by its upper end in a bush 16 forming a downward extension of a shaft 17, the bush 16 being journalled in a bearing 18 in the housing 11 while the upper end of the shaft 17 is journalled in a second bearing 19 at the top of the housing 11. The sheath 12, bush 16 and 17 can thus turn about their common longitudinal axis, for steering purposes when tracing a line, in manner well known generally in line tracing apparatus.

The shaft 17 carries three electrical slip rings 20, 21 and 22 respectively, engaged by electrical contact shoes 23, 24 and 25. Electrical lead 26 is connected to contact shoe 23 and thence to slip ring 20. Electrical lead 27 is connected to contact shoe 24 and thence to slip ring 21. Electrical lead 28 is connected to contact shoe 25 and thence to slip ring 22. The leads 26, 27 and 28 are taken to an external power source and electrical equipment (not shown) forming no part of the present invention.

It is sufficient to explain that three leads, indicated at 29, from the slip rings 20, 21 and 22 carry electrical supply to and from both the piezo-electric crystal rod 14 and the photodiode 13.

The two wider sides of the rod 14 are silver-plated to form terminals and in this embodiment an alternating voltage of mains frequency of fifty cycles per second is applied to the crystal via two of the electrical leads 29, so that the rod, being of approximately two inches in free length, oscillates by resonance at or about the same frequency, which is the predetermined scanning frequency, due to its electrical excitation.

One of the silver-plated sides of the rod (i.e. that at earth potential) is connected to one of the terminals of the photodiode scanning member 13, the other terminal of the photo-diode being connected by the third lead 29, its associated slip ring and contact shoe, to an amplifier (not shown) for the output signals of the photo-diode generated when it is scanning a line.

A strip of spring steel, secured to the rod 14 to be coextensive therewith, is indicated at 30 in the drawing. This flexible reinforcing strip 30 mechanically strengthens the rather brittle piezo-electric crystal rod 14.

Also indicated in the drawing is a lens 31 carried in a housing 32, the function of the lens being to focus an image of a line being scanned upon the photo-diode 13. The housing 32, shown only in part, is carried by the housing 11.

As an alternative to operating at the resonant frequency of the rod 14 incited in the fundamental mode, the rod may be excited in a harmonic or overtone mode at a higher frequency corresponding approximately to "$n$" times the fundamental frequency where "$n$" is an odd integer.

The scanning device is arranged to be steered along a line being traced in such manner that the oscillations of the photodiode 13 are transverse to the line being scanned. If the photodiode 13, oscillating at scanning frequency on the resonating crystal rod 14 passes a signal to an amplifier indicating that the line is not at the desired point of the scan, then the amplifier causes appropriate correcting action to be taken by a steering mechanism in known manner, but this latter arrangement forms no part of the present invention, being given merely by way of explanation, the invention being concerned with the method and means for effecting scanning movement of a scanning device.

What I claim is:

1. In line tracing apparatus having a scanning device including a scanning member which is oscillated to scan a line while the apparatus is moved in the direction of the line, the combination of a steerable support, a rod or piezo-electric material, means mounting said rod by one end to extend from said support, a scanning member, means mounting said scanning member on the free end of said rod, and electrical supply means for applying alternating voltage to said rod to cause the scanning member to make an oscillating scanning motion.

2. Line tracing apparatus as claimed in claim 1, and including at least one reinforcing member secured to said rod.

3. In line tracing apparatus having a scanning device including a scanning member which is oscillated to scan a line while the apparatus is moved in the direction of the line, the combination of a steerable support, a rod of piezo-electric crystal, means mounting said rod by one end to extend from said support, at least one spring steel reinforcing strip secured co-extensively to said rod, a scanning member, means mounting said scanning member on the free end of said rod, and electrical supply means for applying alternating voltage to said rod to cause the scanning member to make an oscillating scanning motion.

4. Line tracing apparatus as claimed in claim 3, wherein the scanning member is a photoelectric cell.

5. Line tracing apparatus according to claim 3, wherein the length of the rod extending from said support is selected to correspond to a predetermined resonating frequency to which the rod is excited electrically by an applied alternating potential.

References Cited by the Examiner

UNITED STATES PATENTS

| | | | |
|---|---|---|---|
| 2,167,254 | 7/1939 | Skellett | 310—8.1 |
| 2,659,829 | 11/1953 | Baerwald | 310—8.1 |
| 3,037,888 | 6/1962 | Lobosco et al. | |
| 3,063,698 | 11/1962 | Hancock | 90—62X |
| 3,117,768 | 1/1964 | Carlin | 310—8.1 |

WILLIAM W. DYER, JR., *Primary Examiner.*